May 21, 1957 E. M. RICHTER 2,793,149
DISPOSABLE AUTOMOBILE FLOOR MAT COVER
Filed Aug. 17, 1955
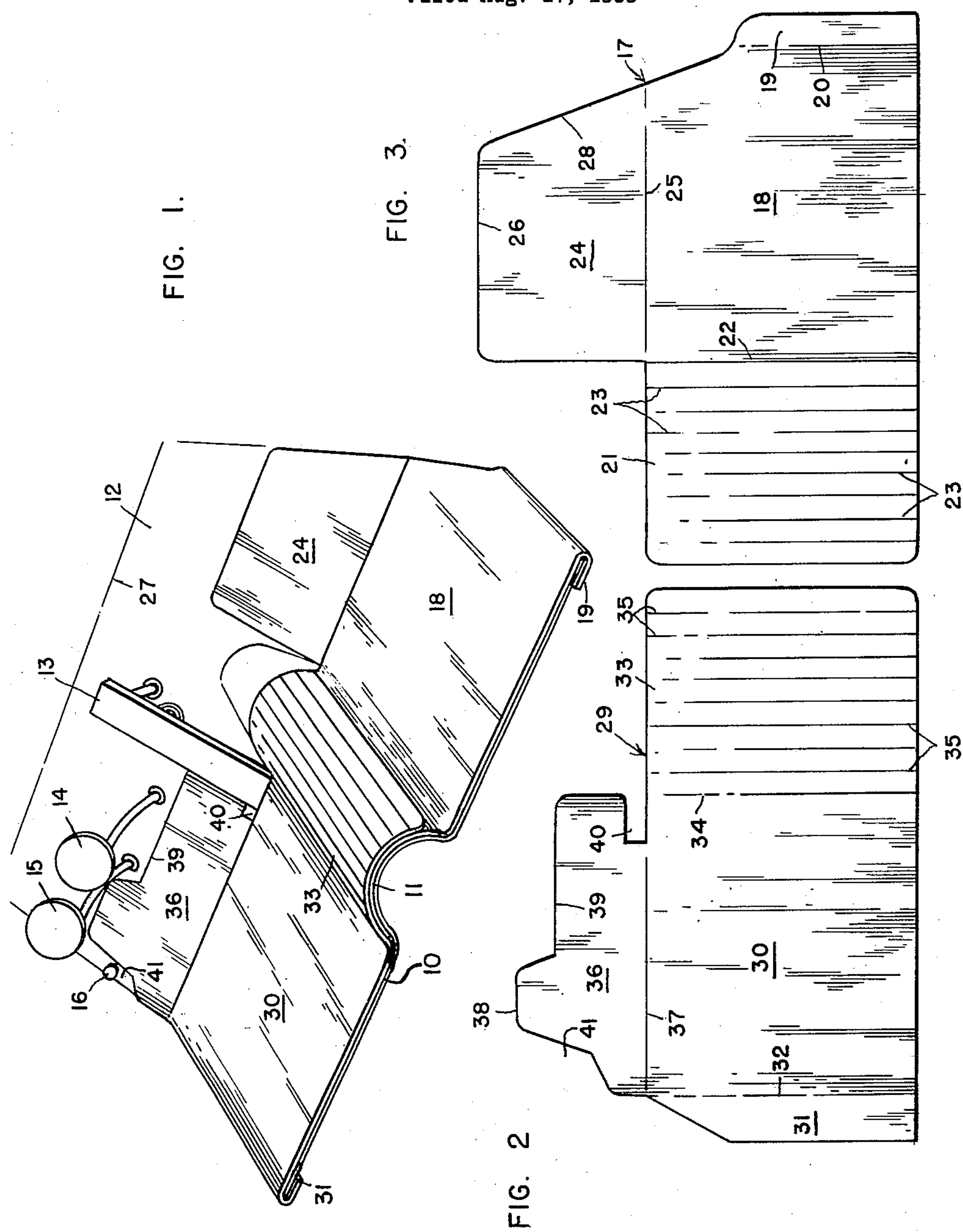
INVENTOR
ELIAS M. RICHTER
BY Kimmel & Crowell
ATTORNEYS

United States Patent Office 2,793,149

Patented May 21, 1957

2,793,149

DISPOSABLE AUTOMOBILE FLOOR MAT COVER

Elias M. Richter, Philadelphia, Pa.

Application August 17, 1955, Serial No. 528,945

1 Claim. (Cl. 154—49)

The present invention relates to disposable automobile floor mat covers, and more particularly to such covers that can be used to protect the floor mats in new automobiles during demonstrations and while the automobile is in stock in the dealership.

The primary object of the invention is to provide a disposable automobile floor mat cover which is formed from relatively inexpensive material so that the floor mat can be covered quite cheaply to make it possible to deliver the new car with no wear or dirt on the floor mats.

Another object of the invention is to provide a disposable automobile floor mat cover which is shaped to fit both the level and inclined surfaces of the floor with cutout portions allowing the control pedals to pass through the cover.

A further object of the invention is to provide a structure of the class described, in which a highly flexible portion is provided to extend over and around the drive shaft tunnel.

Other objects and advantages will become apparent in the following specification when considered in the light of the attached drawings, in which:

Figure 1 is a perspective view of the floor mat shown with its relation to a floor of a motor vehicle;

Figure 2 is a plan view of the left-hand side of the cover, and

Figure 3 is a plan view of the right-hand side of the cover.

Referring now to the drawings in detail wherein like reference numerals indicate like parts throughout the several figures, reference numeral 10 indicates generally a floor mat positioned in the vehicle with the rear portion thereof generally horizontal and having a central portion 11 extending over a drive shaft tunnel (not shown). The floor mat 10 is provided with the forward portion 12 which extends upwardly at an angle to cover the sloped portion of the floor board of the vehicle (not shown).

A gas pedal 13 is positioned in the usual manner, extending through the sloped portion 12 of the floor mat 10, as well as a brake pedal 14, clutch pedal 15 and beam switch 16, which are all positioned conventionally with relation to the vehicle. A cover 17 is provided with a central, generally rectangular panel 18 having a short extension 19 projecting from one side edge thereof and delineating from the central portion 18 by a fold line 20. A panel 21 extends from the central portion 18 oppositely to the short extension 19 and is delineated from the panel 18 by a fold line 22, fold lines 20 and 22 extending generally parallel to each other. The panel 21 is provided with a series of parallely extending spaced-apart fold lines 23 which each extend generally parallel to the fold line 22 and provide the panel 21 with a great deal of flexibility to permit the panel 21 to be readily curved to cover the drive shaft tunnel (not shown).

A forward panel 24 extends from the forward edge of the central panel 18 and is delineated therefrom by means of a fold line 25. Forward panel 24 is adapted to be folded on the fold line 25 to an angular position with relation to the panel 18 to cover the sloped portion 12 of the floor mat 10. The forward edge 26 of the panel 24 is terminated somewhat short of the forward edge 27 of the sloped portion 12 of the floor mat 10, merely covering that portion of the floor mat 10 normally scuffed getting in and out of the car. The outer side edge 28 of the panel 24 is sloped to coincide with the edge of the floor mat 10.

A second cover 29 is provided with a rectangular central panel 30 having a short extension 31 projecting from one side edge thereof and delineated by a fold line 32 from the central panel 30. A panel 33 extends from the central panel 30 opposite to the short extension 31 and is delineated from the panel 30 by means of a fold line 34. The panel 33 is provided with a series of spaced-apart parallel fold lines 35 which extend generally parallel to the fold line 34 and provide the panel 33 with a considerable degree of flexibility to permit it to be curved over the drive shaft tunnel (not shown).

An irregular panel 36 extends forwardly from the central panel 30 and is delineated therefrom by a fold line 37. The irregular panel 36 is adapted to be folded on the fold line 37 to assume an angular position with relation to the central panel 30. The forward edge 38 of the irregular panel 36 terminates short of the forward line 27 of the floor mat 10 and is cut out at 39 to extend under the brake pedal 14 and clutch pedal 15, as illustrated in Figure 1. In addition, the edge marked by the fold line 37 of the irregular panel 36 is cut out as at 40 to form an opening to receive the hinged base portion of the gas pedal 13. The outer edge of the irregular panel 36 is cut away, as at 41, to receive the beam switch 16, as also is illustrated in Figure 1.

In the use and operation of the invention, the panel 18 of the cover 17 is positioned on the right-hand side of the vehicle with the panel 21 curved to overlie the drive shaft tunnel (not shown) and the short extension 19 is folded on the fold line 20 to engage under the side edge portion of the floor mat 10 to assist in securing the panel 18 in position on the floor mat 10. The forward panel 24 is folded to an angular position with relation to the central panel 18 and overlies a portion of the sloped portion 12 of the floor mat 10. The panel 30 is then positioned in the left side of the vehicle with the panel 33 overlying the panel 21 and curved to be in engagement therewith. The short extension 31 is folded on the fold line 32 to underlie the outer edge portion of the floor mat 10 to assist in securing the panel 30 in position thereon. The panel 36 is folded on the fold line 37 to an angular position with relation to the panel 30 and is positioned so that the cutout 39 is below the brake and clutch pedals 14 and 15, with the cutout 40 extending around the lower portion of the gas pedal 13, and the cutout 41 extending around the beam switch 16.

As can be seen in Figure 1, the major exposed areas of the floor mat 10, upon which the feet would normally rest, are covered by the covers 17 and 29 so that any mud or dirt will be prevented from coming in contact with the floor mat 10 and no wear will occur that would be objectionable to the new car purchaser.

The covers 17 and 29 would normally be formed from cardboard or other inexpensive fibrous material which can carry designs simulating floor mat surfaces, as well as being colored to match the decor of the vehicle.

Having thus described the preferred form of the invention, it should be understood that numerous structural modifications and adaptations may be resorted to without departing from the scope of the appended claim.

What is claimed is:

A disposable automobile floor mat cover comprising a unitary flexible paper panel having a generally rectangular configuration, an integral panel extension projecting from one side edge of said first-named panel, said panel extension having a multiplicity of parallel spaced-apart fold creases formed therein, said creases being parallel to the side edge of said first-named panel, a relatively short panel integrally secured to the side edge of said first-named panel opposite said panel extension, said last-named panel and said first-named panel being delineated by a fold crease whereby said last-named panel can be reverted under said first-named panel, and a panel integrally secured to the forward edge of said first panel and delineated therefrom by a fold crease whereby said last named panel can be angularly related to said first named panel.

References Cited in the file of this patent

UNITED STATES PATENTS

| | | |
|---|---|---|
| 1,542,153 | Lewis | June 16, 1925 |
| 1,676,499 | McCorkindale | July 10, 1928 |
| 1,935,900 | Altheimer | Nov. 21, 1933 |
| 2,306,987 | Yount | Dec. 29, 1942 |
| 2,505,554 | Kravitz | Apr. 25, 1950 |